(12) United States Patent
Hall et al.

(10) Patent No.: US 8,395,388 B2
(45) Date of Patent: *Mar. 12, 2013

(54) CIRCUMFERENTIALLY SPACED MAGNETIC FIELD GENERATING DEVICES

(75) Inventors: David R. Hall, Provo, UT (US); Paula Turner, Pleasant Grove, UT (US); Clint Cook, Provo, UT (US)

(73) Assignee: Schlumberger Technology Corporation, Houston, TX (US)

( * ) Notice: Subject to any disclaimer, the term of this patent is extended or adjusted under 35 U.S.C. 154(b) by 509 days.

This patent is subject to a terminal disclaimer.

(21) Appl. No.: 12/550,501

(22) Filed: Aug. 31, 2009

(65) Prior Publication Data

US 2010/0001734 A1      Jan. 7, 2010

Related U.S. Application Data (63) Continuation-in-part of application No. 12/473,416, filed on May 28, 2009, which is a continuation-in-part of application No. 12/341,771, filed on Dec. 22, 2008, now Pat. No. 7,898,259, which is a continuation-in-part of application No. 11/776,447, filed on Jul. 11, 2007, now Pat. No. 7,598,742.

(60) Provisional application No. 60/914,619, filed on Apr. 27, 2007.

(51) Int. Cl.
*G01V 3/00* (2006.01)

(52) U.S. Cl. ............................................... 324/338

(58) Field of Classification Search .................. None
See application file for complete search history.

(56) References Cited

U.S. PATENT DOCUMENTS

| | | |
|---|---|---|
| 3,960,692 A | 6/1976 | Weyl et al. |
| 4,278,556 A | 7/1981 | Tada |
| 4,302,722 A | 11/1981 | Gianzero |
| 4,536,714 A | 8/1985 | Clark |
| 4,563,714 A | 1/1986 | Takeuchi |
| 4,648,627 A | 3/1987 | Reimert |
| 4,766,384 A | 8/1988 | Kleinberg et al. |
| 4,785,247 A | 11/1988 | Meador et al. |
| 4,808,929 A | 2/1989 | Oldigs |
| 4,839,644 A | 6/1989 | Safinya et al. |
| 4,881,988 A | 11/1989 | Bonser |
| 4,933,640 A | 6/1990 | Kuckes |
| 4,980,643 A | 12/1990 | Gianzero et al. |
| 5,045,795 A | 9/1991 | Gianzero et al. |
| 5,081,419 A | 1/1992 | Meador et al. |
| 5,089,779 A | 2/1992 | Roden |
| 5,095,272 A | 3/1992 | Sinclair |
| 5,138,263 A | 8/1992 | Towle |
| 5,428,293 A | 6/1995 | Sinclair et al. |
| 5,442,294 A | 8/1995 | Rorden |
| 5,448,227 A | 9/1995 | Orban et al. |
| 5,463,319 A | 10/1995 | Chesnutt et al. |
| 5,467,832 A | 11/1995 | Orban et al. |
| 5,491,488 A | 2/1996 | Wu |
| 5,530,358 A | 6/1996 | Wisler |

(Continued)

*Primary Examiner* — Jermele M Hollington
(74) *Attorney, Agent, or Firm* — Brinks Hofer Gilson & Lione (57) ABSTRACT

A downhole induction resistivity assembly that comprises a downhole tool string component. The tool string component comprises an induction transmitter. The transmitter is adapted to induce an induction field in the surrounding formation. A first induction receiver is spaced apart from the transmitter and is adapted to measure the induction field. A magnetic field generating mechanism is disposed circumferentially adjacent the transmitter and adapted to guide the transmitter's signal into the formation.

19 Claims, 9 Drawing Sheets

U.S. PATENT DOCUMENTS

| | | | |
|---|---|---|---|
| 5,594,343 A | 1/1997 | Clark et al. |
| 5,606,260 A | 2/1997 | Giordano et al. |
| 5,668,475 A | 9/1997 | Orban et al. |
| 5,747,743 A | 5/1998 | Kato et al. |
| 5,833,019 A | 11/1998 | Gynz-Rekowski |
| 5,905,379 A | 5/1999 | Orban et al. |
| 5,936,913 A | 8/1999 | Gill et al. |
| 6,068,394 A | 5/2000 | Dublin |
| 6,082,484 A | 7/2000 | Molz et al. |
| 6,100,696 A | 8/2000 | Sinclair |
| 6,114,972 A | 9/2000 | Smith |
| 6,163,155 A | 12/2000 | Bittar |
| 6,191,586 B1 | 2/2001 | Bittar |
| 6,218,842 B1 | 4/2001 | Bittar et al. |
| 6,259,030 B1 | 7/2001 | Tanigawa et al. |
| 6,281,801 B1 | 8/2001 | Cherry et al. |
| 6,285,014 B1 | 9/2001 | Beck et al. |
| 6,297,639 B1 | 10/2001 | Clark et al. |
| 6,344,746 B1 | 2/2002 | Chunduru et al. |
| 6,359,438 B1 | 3/2002 | Bittar |
| 6,422,336 B1 | 7/2002 | Abele et al. |
| 6,476,609 B1 | 11/2002 | Bittar |
| 6,538,447 B2 | 3/2003 | Bittar |
| 6,577,129 B1 | 6/2003 | Thompson et al. |
| 6,586,939 B1 | 7/2003 | Fanini et al. |
| 6,614,360 B1 | 9/2003 | Leggett et al. |
| 6,630,831 B2 | 10/2003 | Amini |
| 6,641,434 B2 | 11/2003 | Boyle et al. |
| 6,646,441 B2 | 11/2003 | Thompson et al. |
| 6,655,452 B2 | 12/2003 | Zillinger |
| 6,667,620 B2 | 12/2003 | Homan et al. |
| 6,670,880 B1 | 12/2003 | Hall et al. |
| 6,671,224 B1 | 12/2003 | Pabon |
| 6,677,756 B2 | 1/2004 | Fanini et al. |
| 6,680,613 B2 | 1/2004 | Rosthal et al. |
| 6,688,396 B2 | 2/2004 | Floerke et al. |
| 6,690,170 B2 | 2/2004 | Homan et al. |
| 6,703,837 B1 | 3/2004 | Wisler et al. |
| 6,765,385 B2 | 7/2004 | Sinclair et al. |
| 6,768,407 B2 | 7/2004 | Kohda et al. |
| 6,768,700 B2 | 7/2004 | Veneruso et al. |
| 6,777,940 B2 | 8/2004 | Macune |
| 6,810,331 B2 | 10/2004 | Bittar et al. |
| 6,814,162 B2 | 11/2004 | Moran et al. |
| 6,849,195 B2 | 2/2005 | Basheer et al. |
| 6,900,640 B2 * | 5/2005 | Fanini et al. ........... 324/339 |
| 6,913,095 B2 | 7/2005 | Krueger |
| 6,915,701 B1 | 7/2005 | Tarler |
| 6,975,243 B2 | 12/2005 | Clark et al. |
| 6,984,980 B2 | 1/2006 | Kruspe et al. |
| 7,026,820 B2 | 4/2006 | Xiao et al. |
| 7,028,543 B2 | 4/2006 | Hardage et al. |
| 7,031,839 B2 | 4/2006 | Tabarovsky et al. |
| 7,032,707 B2 | 4/2006 | Egerev et al. |
| 7,038,457 B2 * | 5/2006 | Chen et al. ........... 324/339 |
| 7,040,003 B2 | 5/2006 | Hall et al. |
| 7,046,009 B2 | 5/2006 | Itskovich |
| 7,057,392 B2 | 6/2006 | Wang et al. |
| 7,064,676 B2 | 6/2006 | Hall et al. |
| 7,091,810 B2 | 8/2006 | Hall et al. |
| 7,095,232 B2 | 8/2006 | Haber et al. |
| 7,098,657 B2 | 8/2006 | Guilhamat et al. |
| 7,098,858 B2 | 8/2006 | Bittar et al. |
| 7,116,199 B2 | 10/2006 | Hall et al. |
| 7,138,803 B2 | 11/2006 | Bittar |
| 7,138,897 B2 | 11/2006 | Minerbo et al. |
| 7,141,981 B2 | 11/2006 | Folberth et al. |
| 7,150,316 B2 | 12/2006 | Itskovich |
| 7,150,317 B2 | 12/2006 | Barolak et al. |
| 7,193,420 B2 | 3/2007 | Chen et al. |
| 7,212,132 B2 | 5/2007 | Gao et al. |
| 7,212,173 B2 | 5/2007 | Chen et al |
| 7,265,649 B1 | 9/2007 | Hall et al. |
| 7,284,605 B2 | 10/2007 | Clark et al. |
| 7,301,429 B1 | 11/2007 | Hall et al. |
| 7,334,661 B2 | 2/2008 | Pabon et al. |
| 7,360,610 B2 | 4/2008 | Hall et al. |
| 7,477,114 B2 | 1/2009 | Pivit et al. |
| 7,525,315 B2 | 4/2009 | Fredette et al. |
| 7,541,813 B2 | 6/2009 | Synder, Jr. et al. |
| 7,551,516 B2 | 6/2009 | Harmon |
| 7,588,082 B2 | 9/2009 | Lasater |
| 7,598,742 B2 | 10/2009 | Synder et al. |
| 7,639,562 B2 | 12/2009 | Patterson et al. |
| 7,730,972 B2 | 6/2010 | Hall et al. |
| 7,777,644 B2 | 8/2010 | Madhavan et al. |
| 7,884,611 B1 | 2/2011 | Hall et al. |
| 7,898,259 B2 * | 3/2011 | Hall et al. ........... 324/339 |
| 7,902,955 B2 | 3/2011 | Veneruso et al. |
| 7,980,331 B2 | 7/2011 | Hall et al. |
| 7,994,791 B2 * | 8/2011 | Hall et al. ........... 324/339 |
| 8,030,936 B2 | 10/2011 | Hall et al. |
| 2003/0090269 A1 | 5/2003 | Fanini et al. |
| 2003/0151408 A1 | 8/2003 | Kruspe et al. |
| 2005/0045343 A1 | 3/2005 | Bixenman et al. |
| 2005/0116718 A1 | 6/2005 | Chen et al. |
| 2005/0152219 A1 | 7/2005 | Garcia-Osuna et al. |
| 2005/0189947 A1 | 9/2005 | Haugland |
| 2006/0077757 A1 | 4/2006 | Cox et al. |
| 2006/0192561 A1 | 8/2006 | Chesser et al. |
| 2006/0208383 A1 | 9/2006 | Aisenbrey |
| 2006/0267200 A1 | 11/2006 | Mickle et al. |
| 2007/0017705 A1 | 1/2007 | Lasater |
| 2007/0257679 A1 | 11/2007 | Fanini et al. |
| 2008/0224707 A1 | 9/2008 | Wisler et al. |
| 2009/0025982 A1 | 1/2009 | Hall et al. |
| 2009/0160445 A1 * | 6/2009 | Hall et al. ........... 324/339 |
| 2009/0160447 A1 | 6/2009 | Hall et al. |
| 2009/0160448 A1 | 6/2009 | Hall et al. |
| 2009/0230969 A1 | 9/2009 | Hall et al. |
| 2009/0267790 A1 | 10/2009 | Hall et al. |
| 2010/0052689 A1 | 3/2010 | Hall et al. |
| 2010/0295547 A1 * | 11/2010 | Hall et al. ........... 324/339 |
| 2011/0068797 A1 * | 3/2011 | Hall et al. ........... 324/339 |
| 2011/0227578 A1 * | 9/2011 | Hall et al. ........... 324/343 |
| 2012/0121960 A1 | 5/2012 | Hall et al. |

* cited by examiner

CIRCUMFERENTIALLY SPACED MAGNETIC FIELD GENERATING DEVICES

CROSS REFERENCE TO RELATED APPLICATIONS

This application is a continuation-in-part of U.S. patent application Ser. No. 12/473,416 filed on May 28, 2009, which is a continuation-in-part of U.S. patent application Ser. No. 12/341,771 filed on Dec. 22, 2008 and which is now U.S. Pat. No. 7,898,259 issued on Mar. 1, 2011, which is a continuation-in-part of U.S. patent application Ser. No. 11/776,447 filed on Jul. 11, 2007 and which is now U.S. Pat. No. 7,598,742 issued on Oct. 6, 2009, which, in turn, claims priority to U.S. Provisional Patent Application No. 60/914,619 filed on Apr. 27, 2007, which was abandoned on Jul. 24, 2007, and entitled "Resistivity Tool." This application is also related to U.S. patent application Ser. No. 11/676,494 filed on Feb. 19, 2007 and which is now U.S. Pat. No. 7,265,649 issued on Sep. 4, 2007; U.S. patent application Ser. No. 11/687,891 filed on Mar. 19, 2007 and which is now U.S. Pat. No. 7,301,429 issued on Nov. 27, 2007; and U.S. Provisional Patent Application No. 61/073,190 which was abandoned on Oct. 8, 2008. All of the above mentioned references are herein incorporated by reference for all that they contain.

BACKGROUND

Electric resistivity of a downhole formation is often measured from a wireline or drill string component in a well bore to analyze formation parameters. Induction resistivity tools induce a magnetic field into the formation; and thus, are different from laterolog resistivity systems, where an electric current is passed through the formation.

U.S. Pat. No. 6,677,756 to Fanini, et al., which is herein incorporated by reference for all that it contains, discloses an induction tool for formation resistivity evaluations. The induction tool provides electromagnetic transmitters and sensors suitable for transmitting and receiving magnetic fields in radial directions.

U.S. Pat. No. 6,359,438 to Bittar, which is herein incorporated by reference for all that it contains, discloses a resistivity tool for use in an logging while drilling system that includes a transmitter array with multiple transmitters positioned above a pair of receivers. The transmitters are selectively energized, causing current to be induced in the collar of the resistivity tool.

U.S. Pat. No. 6,577,129 to Thompson, et al., which is herein incorporated by reference for all that it contains, discloses an electromagnetic wave propagation resistivity borehole logging system comprising multiple groups of electromagnetic transmitter-receiver arrays operating at three frequencies.

U.S. Pat. No. 6,538,447 to Bittar, which is herein incorporated by reference for all that it contains, discloses a multimode resistivity tool for use in a logging-while-drilling system that includes an asymmetric transmitter design with multiple transmitters capable of generating electromagnetic signals at multiple depths of investigation.

U.S. Pat. No. 7,141,981 to Folbert, et al., which is herein incorporated by reference for all that it contains, discloses a resistivity logging tool suitable for downhole use that includes a transmitter, and two spaced apart receivers. The measured resistivities at the two receivers are corrected based on measuring the responses of the receivers to a calibration signal.

U.S. Pat. No. 6,218,842 to Bittar, et al., which is herein incorporated by reference for all that it contains, discloses a resistivity tool for use in logging while drilling systems that includes an asymmetric transmitter design with multiple transmitters capable of generating EM signals at multiple frequencies.

U.S. Pat. No. 5,045,795 to Gianzero, et al. which is herein incorporated by reference for all that it contains, discloses a coil array which is installed on a monitoring while drilling drill collar for use in a resistivity logging system. The drill collar is provided with upper and lower coil support rings. These are toroids which support individual coil segments, and are connected by suitable magnetic shorting bars. The coil segments and shorting bars inscribe a specified solid angle or azimuthal extent.

U.S. Pat. No. 5,606,260 to Giordano, et al., which is herein incorporated by reference for all that it contains, discloses a microdevice is provided for measuring the electromagnetic characteristics of a medium in a borehole. The microdevice includes at least one emitting or transmitting coil, and at least one receiving coil. The micro device generates an A.C. voltage at the terminals of the transmitting coil and measures a signal at the terminals of the receiving coil. The micro device also includes an E-shaped electrically insulating, soft magnetic material circuit serving as a support for each of the coils and which is positioned adjacent to the medium in the borehole.

U.S. Pat. No. 6,100,696 to Sinclair, which is herein incorporated by reference for all that it contains, discloses a directional induction logging tool that is provided for measurement while drilling. This direction induction logging tool is preferably placed in a side pocket of a drill collar, and it comprises transmitter and receiver coils and an electromagnetic reflector.

U.S. Pat. No. 6,163,155 to Bittar, et al., which is herein incorporated by reference for all that it contains, discloses a downhole method and apparatus for simultaneously determining the horizontal resistivity, vertical resistivity, and relative dip angle for anisotropic earth formations.

U.S. Pat. No. 6,476,609 to Bittar, et al., which is herein incorporated by reference for all that it contains, discloses an antenna configuration in which a transmitter antenna and a receiver antenna are oriented in non-parallel planes such that the vertical resistivity and the relative dip angle are decoupled.

BRIEF SUMMARY

A downhole induction resistivity assembly includes a downhole tool string component. The downhole tool string component includes an induction transmitter. The induction transmitter is adapted to induce an induction field in a surrounding formation. A first induction receiver is spaced apart from the transmitter and is adapted to measure the induction field. A magnetic field generating mechanism is spaced circumferentially adjacent on either or both sides of the transmitter and adapted to guide the transmitter's signal into the formation.

The magnetic field generating mechanism generates an augmented magnetic field and/or a directed magnetic field. Some embodiments of either the magnetic field generating mechanism or the induction transmitter may comprise: a Halbach array, a substantially U-shaped magnetic core, or some other magnetic field inducing mechanism.

The transmitter and/or at least one of the receivers may comprise a magnetic core disposed substantially parallel with an axis of the tool string component. The transmitter and/or at least one of the receivers may also comprise a plurality of circumferentially spaced units that are independently excitable. In some embodiments, the units may be tilted with respect to the tool string's central axis.

DETAILED DESCRIPTION

Figure 1:
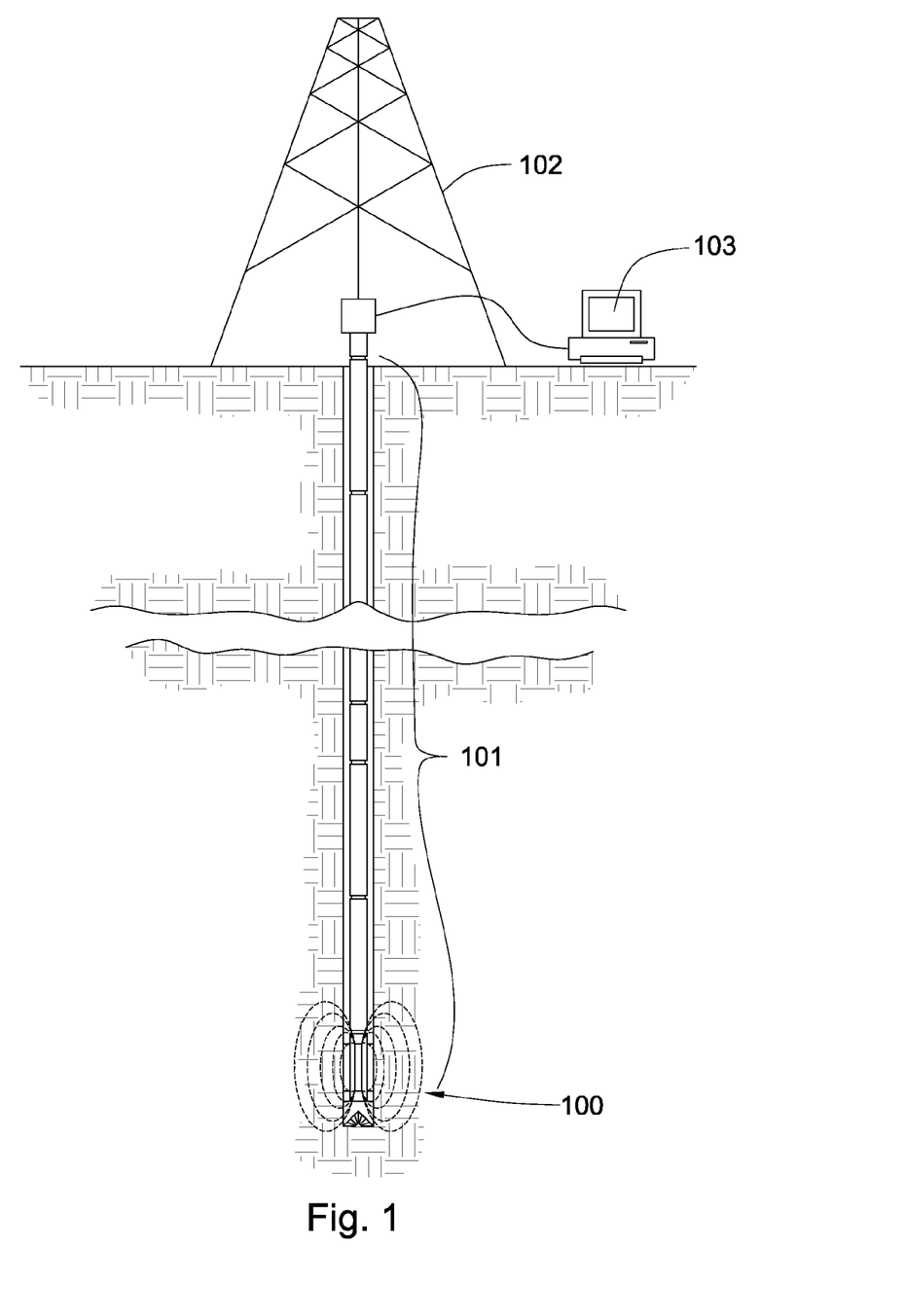
FIG. 1 is a cross-sectional diagram of an embodiment of a downhole tool string.

Referring now to FIG. 1, a downhole tool string 101 may be suspended by a derrick 102. The downhole tool string 101 may comprise one or more downhole components 100, linked together in the tool string 101 and in communication with surface equipment 103 through a downhole network. The downhole network may enable high-speed communication between devices connected to the tool string 101, and the network may facilitate the transmission of data between sensors and sources. The data gathered by the downhole instrumentation may be processed downhole, may be transmitted to the surface for processing, may be filtered downhole and then transmitted to the surface for processing, may be compressed downhole and then transmitted to the surface for processing, or may be combinations thereof.

Figure 2:
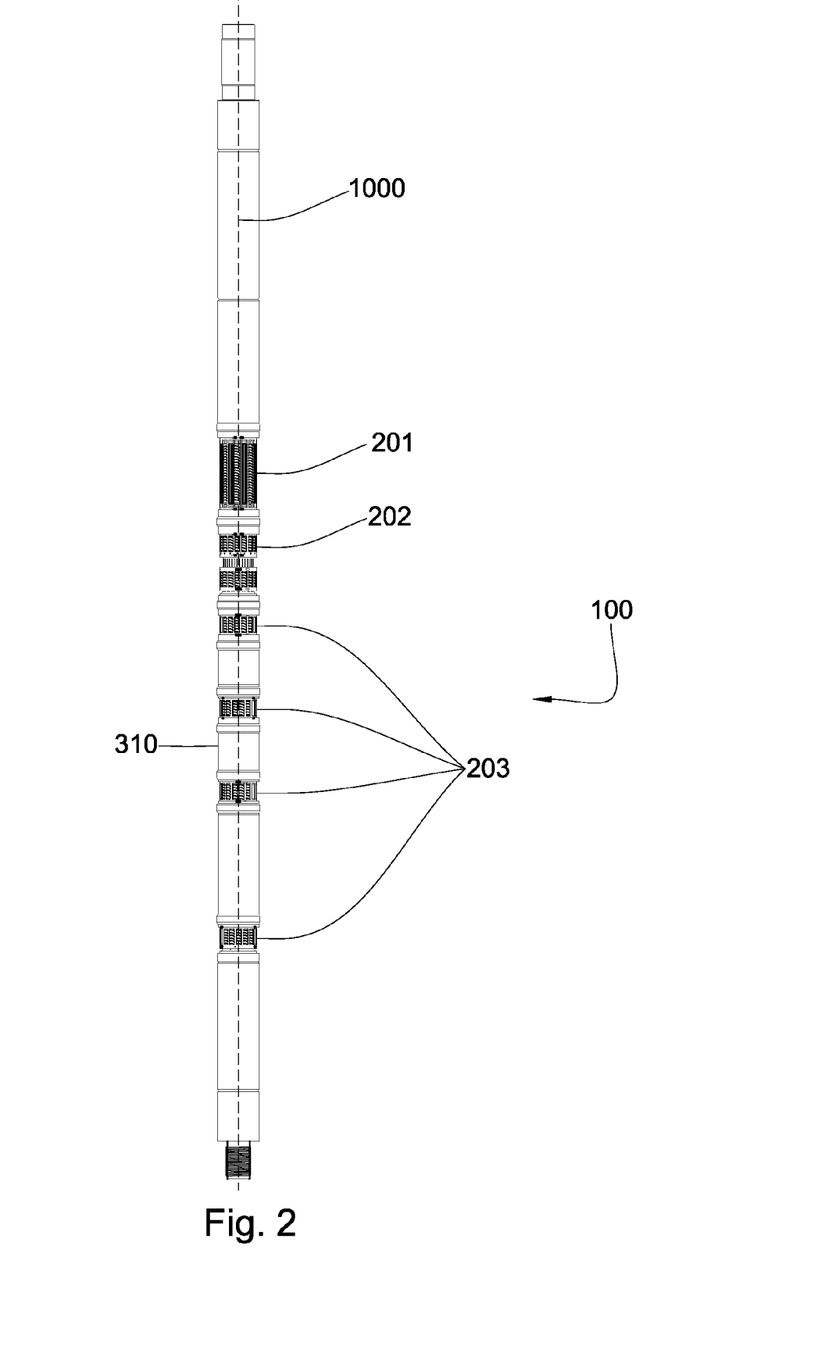
FIG. 2 is an orthogonal diagram of an embodiment of tool string component.

FIG. 2 is an embodiment of a tool string component 100A. The tool string component 100A may have an induction transmitter 201A and a plurality of induction receivers 202A and 203A. The receivers 202A and 203A may be placed in a variety of orientations with respect to each other and with respect to the transmitter 201A. The induction transmitter 201A is adapted to send an induction signal in to a formation, which generates an induced field in the formation surrounding the well bore. The induction receivers 202A and 203A are adapted to sense various attributes of the induced formation field. These attributes may include, among others, some or all of the following: frequency, amplitude, or phase. The induction transmitter 201A and the induction receivers 202A and 203A may be powered by batteries, a turbine generator, or from the downhole network. The induction receivers 202A and 203A may also be passive. In some embodiments, there may be several induction transmitters located along the length of the tool string component 100A. In some embodiments, the additional transmitters may be used to calibrate measurements, such as is common in borehole compensation techniques.

Figure 3A:
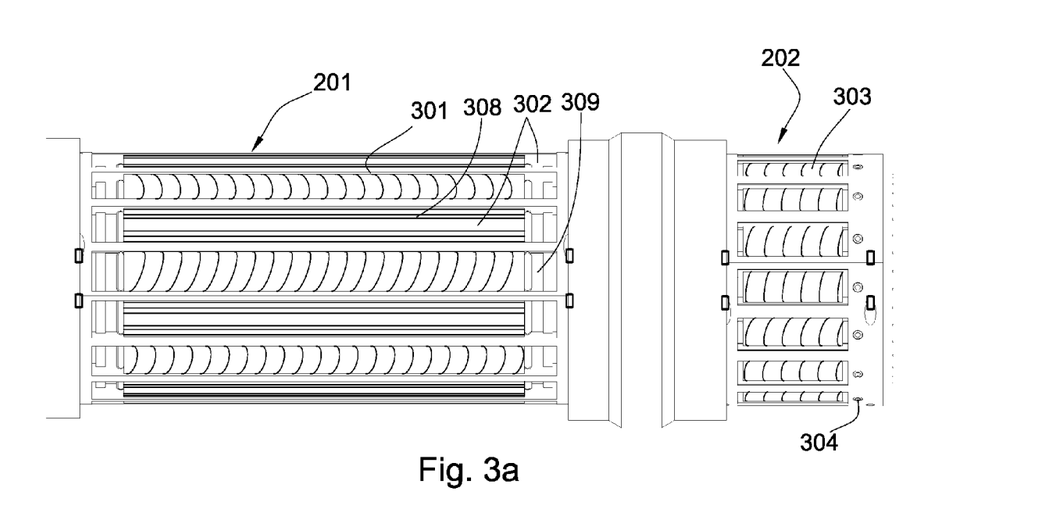
FIG. 3a is an orthogonal diagram of an embodiment of an induction transmitter.
Figure 3B:
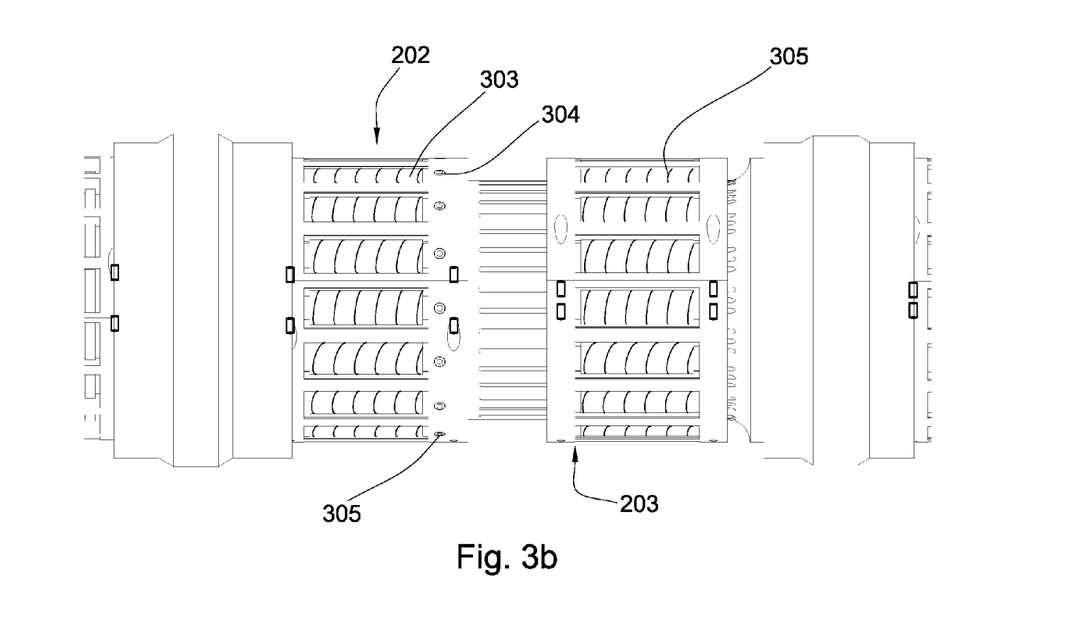
FIG. 3b is an orthogonal diagram of an embodiment of an induction receiver.

FIG. 3a is a close-up view of the tool string component 100A of FIG. 2 illustrating an embodiment of an induction transmitter 201A disposed within the tool string component, and FIG. 3b is a close up view of the tool string component 100A illustrating an embodiment of three induction receivers 202A, 203A, and 304A. The induction transmitter 201A may comprise an array of induction transmitter units 301A spaced circumferentially around the tool string 100A. The induction transmitter units 301A may lie parallel to the body of the stool string 100A. The induction transmitter units 301A may be independently excitable. Independently excitable induction transmitter units 301 may focus the induction field in only a portion of the formation adjacent to the excitable induction transmitter units while the remaining portion of the formation is minimally affected or not affected at all. Furthermore, it is believed that the ability to concentrate the field in portions of the formation adjacent the well bore will allow for directional measurements of the formation. Data received through directional measurement may verify a current drilling trajectory or it may reveal needed adjustments. Steering adjustments may be made by a steering system in communication with a downhole communication system, such as the system disclosed in U.S. Pat. No. 6,670,880 to Hall et al., which is herein incorporated by reference for all that it discloses. An embodiment of a compatible steering system is disclosed in U.S. patent application Ser. No. 12/262,372 to Hall et al., which is herein incorporated by reference for all that it contains.

The induction transmitter 201A may also comprise at least one magnetic field generating mechanism 302A, which may guide the induction field produced by the induction transmitter units 301A by forcing the induction transmitter's 301A signal deeper into the formation. The magnetic field generating mechanism 302A may be spaced circumferentially adjacent 308A to the induction transmitter unit 301A or longitudinally adjacent 309A to the induction transmitter unit 301A. In some embodiments, the induction transmitter units and the magnetic field generating mechanisms are alternatively spaced along the circumference of an outer surface of the tool string component 100A. The windings on the induction transmitter 201A may be in a different direction than the windings on the magnetic field generating mechanism 302A. In some embodiments, the magnetic field generating mechanism 302A may generate an augmented field or a directed field. Examples of magnetic field generating mechanism that may be used to influence the signal from the transmitter include Halbach arrays, electromagnets, and directed magnetic fields. The induction transmitter's 301A signal may travel along the path of least resistance, which, without the magnetic field generating mechanism 302A, could be within a shallower region of the formation, through the drilling mud or even along the surface of the tool string component 100A. The magnetic field generating mechanism 302A may generate a magnetic field that repels the signal away from the tool string component A, and thus, forcing the signal deeper into the formation.

Figure 4A:
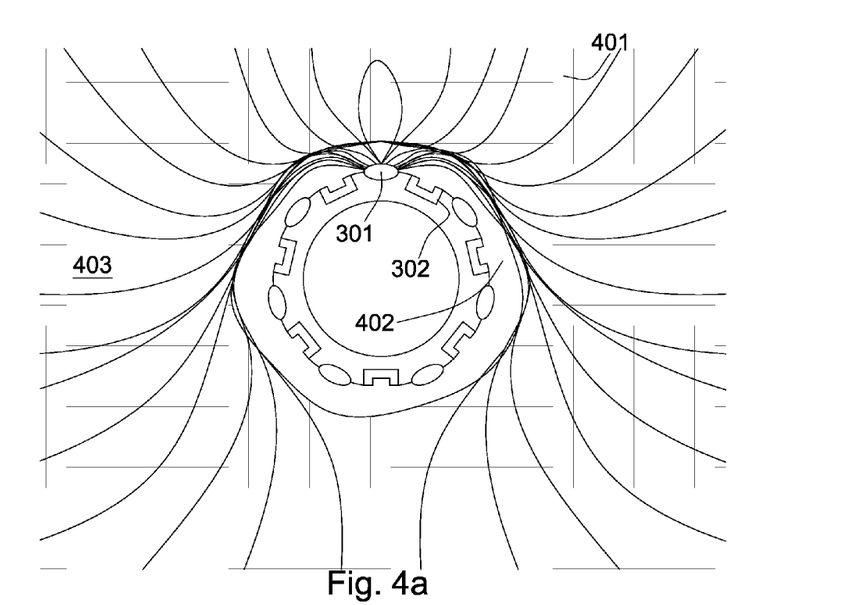
FIG. 4a is a cross sectional diagram of an embodiment of an induction resistivity assembly.
Figure 4B:
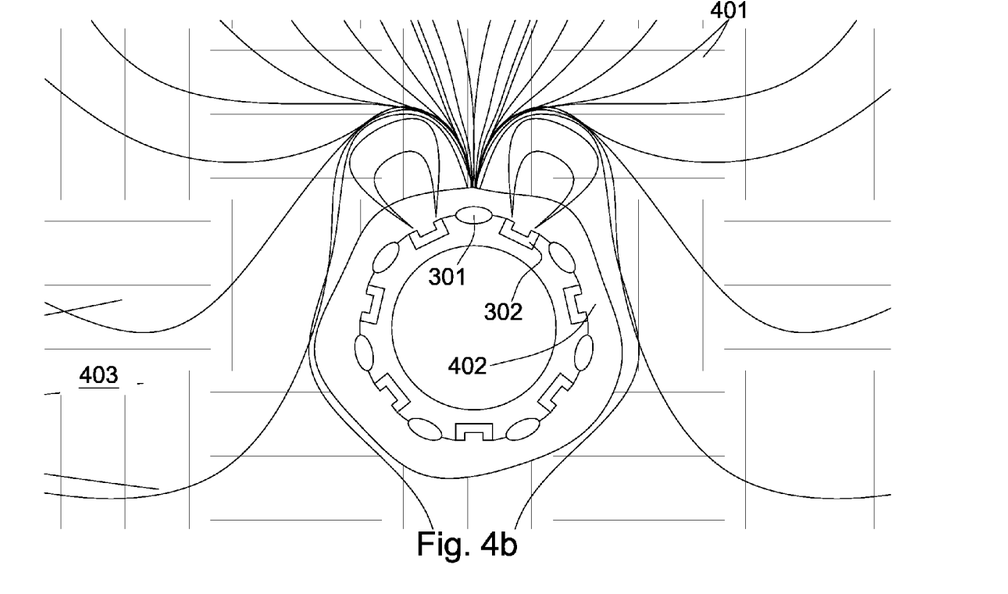
FIG. 4b is a cross sectional diagram of another embodiment of an induction resistivity assembly.

Referring now to FIG. 4a, a cross-section of an embodiment of a tool string component 100B is depicted in a borehole of a formation 403B. The tool string component 100B comprises an induction transmitter unit 301B, and a magnetic field generating mechanism 302B. The induction transmitter unit 301B is depicted generating an induction signal 401B with the magnetic field generating mechanism 302B being inactive. Drilling mud 402B is disposed between the tool string component 100B and the formation 403B. The magnetic field 401B may tend to predominately travel within the bore hole or within a shallow portion of the formation 403B infiltrated by drilling mud and may not penetrate deeply into the formation 403B. This may prevent an accurate reading of the formation B surrounding the bore hole. FIG. 4b depicts a cross-section of the embodiment of a tool string component 100B depicted FIG. 4a, but with both the transmitter unit 301B and the magnetic field generating mechanism 302B activated, which forces the induction signal 401B deeper into the formation 403B. It is believed that by adjusting the output of the magnetic field generating mechanism 302B the penetration depth of the induction signal 401B may be controlled. The magnetic field generating mechanisms 302B may be positioned on one and/or both sides of the transmitter 201B.

Figure 5A:
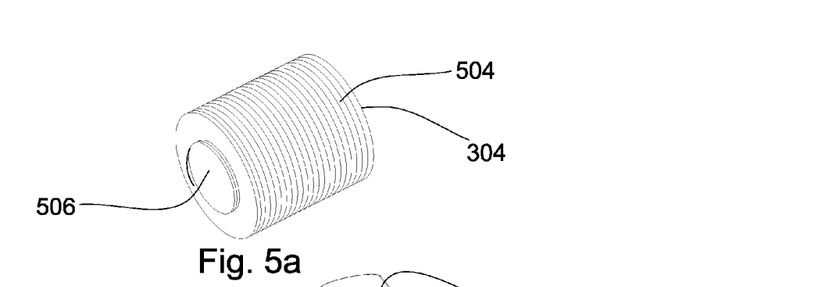
FIG. 5a is a perspective diagram of another embodiment of an induction receiver.
Figure 5B:
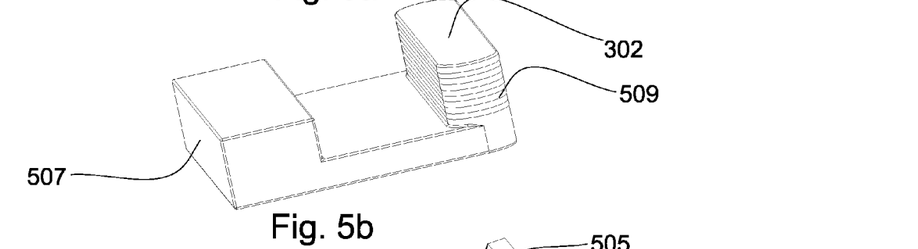
FIG. 5b is perspective diagram of another embodiment of an induction transmitter.
Figures 5C, 5D:
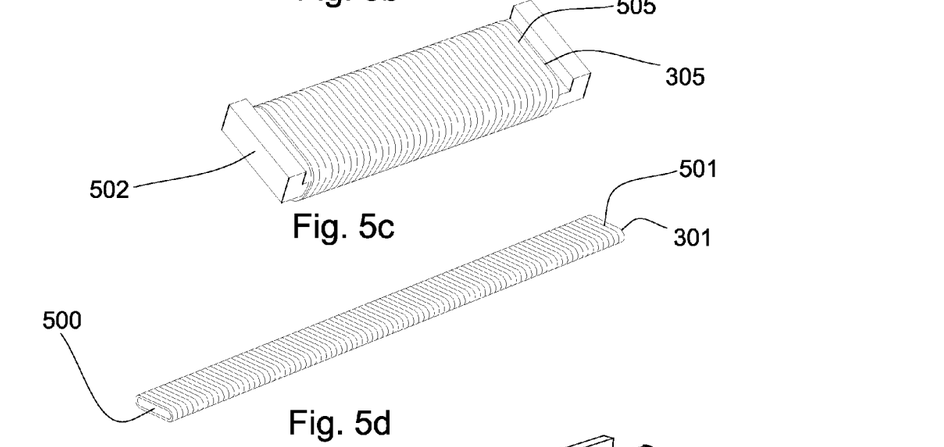
FIG. 5c is a perspective diagram of another embodiment of an induction receiver.
FIG. 5d is a perspective diagram of another embodiment of an induction transmitter.
Figure 5E:
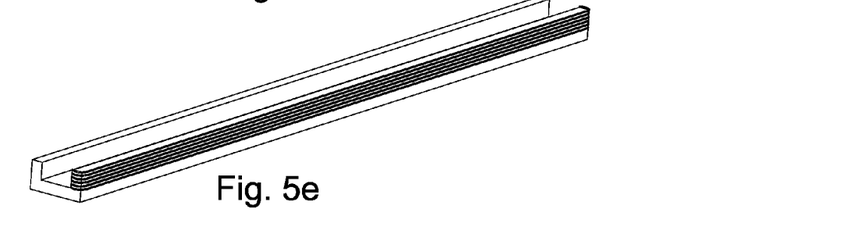
FIG. 5e is a perspective diagram of an embodiment of a magnetic field generating mechanism.

FIG. 5a illustrates an embodiment of a spool induction receiver 304C that may comprise a ferrite core 506C wrapped in wire 504C. FIG. 5b discloses illustrates an embodiment of a longitudinally adjacent magnetic field generating mechanism 302C such as longitudinally adjacent magnetic field generating mechanism 302B of FIGS. 4a and 4b. The longitudinally adjacent magnetic field generating mechanism 302C has a U shaped ferrite core 507C wrapped in wire 509C. FIG. 5c illustrates an embodiment of an independently excitable unit of a receiver 305C and/or transmitter with a ferrite core 502C wrapped in wire 505C. FIG. 5d illustrates an embodiment of a spool transmitter 301C and/or receiver. The spool transmitter 301C and/or receiver may comprise a ferrite core 500C wrapped in wire 501C. FIG. 5e discloses an embodiment of a circumferentially adjacent magnetic field generating mechanism 308C. In some embodiments, the wires depicted in FIGS. 5a-e may be Litz wire. In some embodiments, the wire windings on the various components may be wrapped in different directions or different patterns than each other.

Figure 6A:
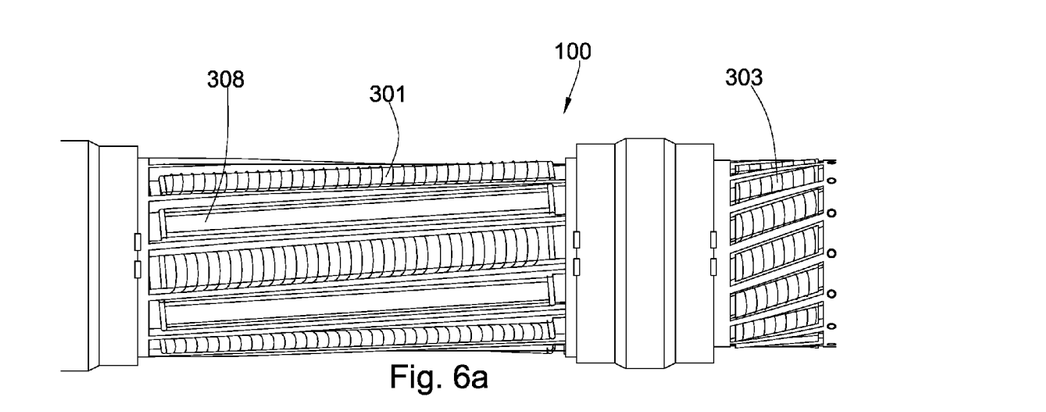
FIG. 6a is an orthogonal diagram of another embodiment of an induction transmitter.
Figure 6B:
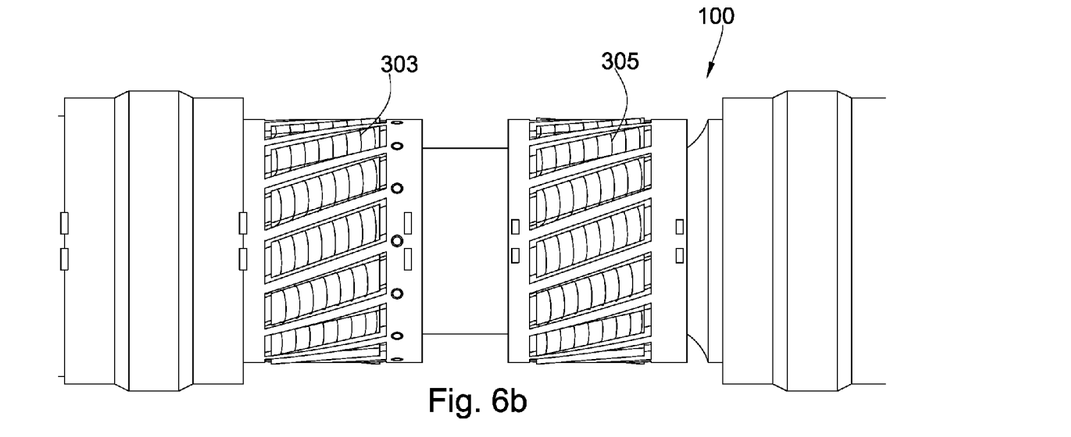
FIG. 6b is an orthogonal diagram of another embodiment of an induction receiver.

FIG. 6a illustrates an embodiment of a tool string component 100D with transmitter units 301D and magnetic field generating mechanisms 308D tilted with respect to a central axis of the tool string component 100D. FIG. 6b illustrates an embodiment of a tool string component 100E with receiver units 305E tilted. The tilt angle may be at any degree, but preferably between 10 and 50 degrees off central axis of the tool string component 100E.

Figure 7A:
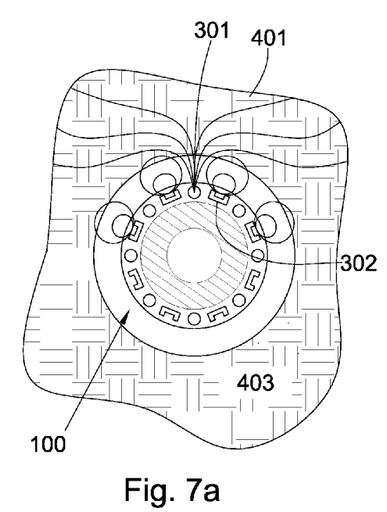
FIG. 7a is a cross sectional diagram of a downhole tool string component.

FIG. 7a illustrates an embodiment of a transmitter segment 301F generating an induction signal 401F into a formation 403F. At least two magnetic field generating mechanisms 302F on both side of the transmitter segment 301F may be activated, which is believed to push the transmitter signal deeper into the formation 403F then if only a single magnetic field generating mechanism 302F on both sides.

Figure 7B:
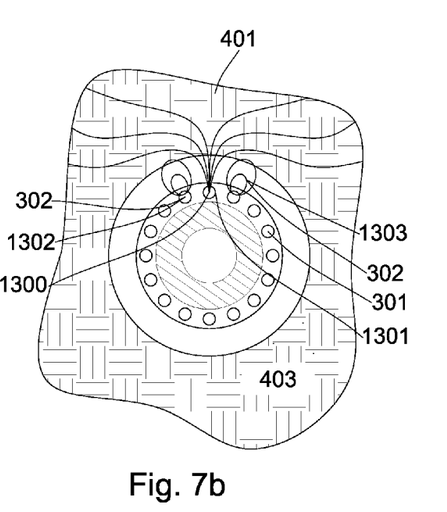
FIG. 7b is a cross sectional diagram of a downhole tool string component.

FIG. 7b illustrates an embodiment of a primary transmitter segment 1300G generating an induction signal 401G into a formation 403G. A first adjacent transmitter segment 1302G and a second adjacent transmitter segment 1303G on either side of the primary transmitter segment 1300G may function as magnetic field generating mechanisms 302G. The adjacent transmitter segments 1302G and 1303G signal's properties may be adjusted to push the induction signal 401G deeper into the formation 403G.

Figures 8, 9:
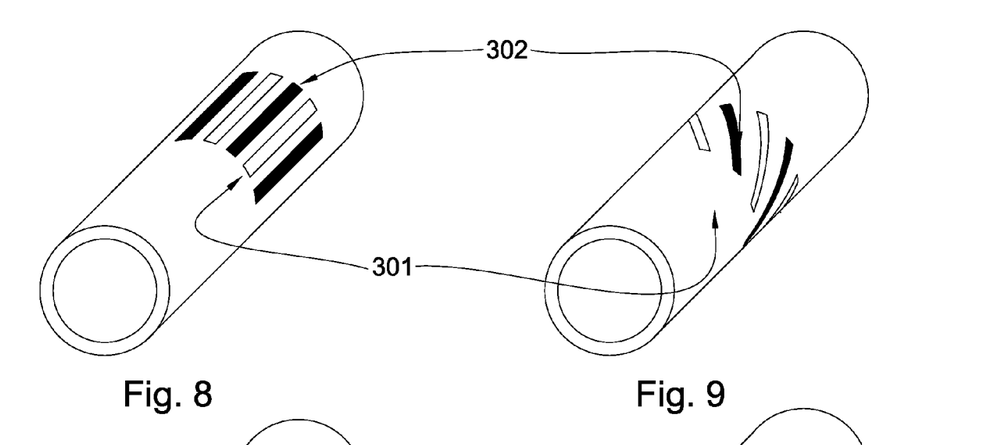
FIG. 8 is a perspective diagram of an embodiment of an induction resistivity assembly.
FIG. 9 is a perspective diagram of an embodiment of an induction resistivity assembly.

FIG. 8 illustrates an embodiment in which transmitter units 301H and magnetic field generating mechanism 302H are alternatively spaced along a circumference of a tool string component 100H.

FIG. 9 illustrates an embodiment of a tool string component 100J having tilted transmitter units 301J and magnetic field generating mechanism 302J alternatively spaced.

Figures 10, 11:
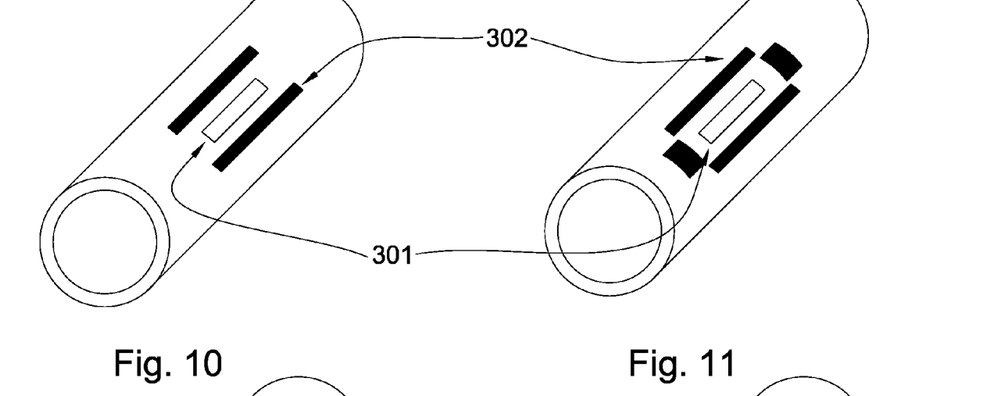
FIG. 10 is a perspective diagram of an embodiment of an induction resistivity assembly.
FIG. 11 is a perspective diagram of an embodiment of an induction resistivity assembly.

FIG. 10 illustrates an embodiment of a tool string component 100K having magnetic field generating mechanisms 302K with a longer length than a transmitter unit 301K. In other embodiments, the transmitter unit's length may be longer than the magnetic field generating mechanisms 302K.

FIG. 11 illustrates an embodiment of a tool string component 100L having a plurality of magnetic field generating mechanisms 302L around a transmitter unit 301L. The plurality of magnetic field generating mechanisms 302L may be wired together, or may be independently excitable.

Figures 12, 13:
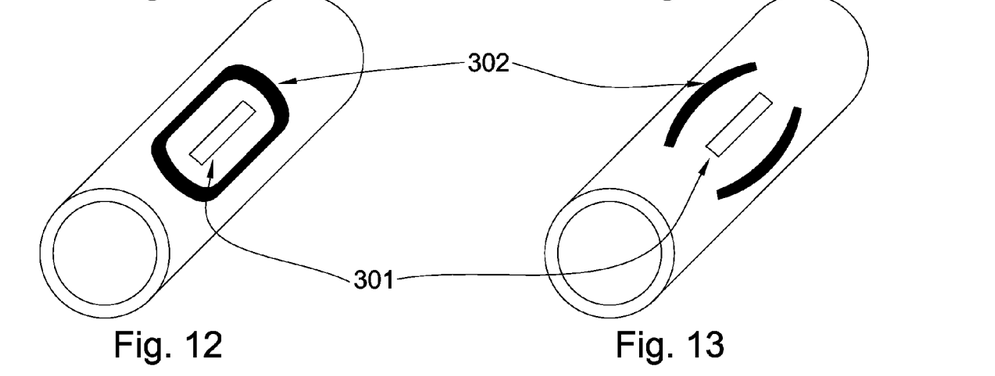
FIG. 12 is a perspective diagram of an embodiment of an induction resistivity assembly.
FIG. 13 is a perspective diagram of an embodiment of an induction resistivity assembly.

FIG. 12 illustrates an embodiment of a tool string component 100M having a single magnetic field generating mechanism 302M that circles a transmitter unit 302M.

FIG. 13 illustrates an embodiment of a tool string component 100N having arced magnetic field generating mechanisms 302N surrounding a transmitter unit 301N. The arced magnetic field generating mechanisms 302N may be independent of each other or electrically connected to one another.

Figures 14, 15:
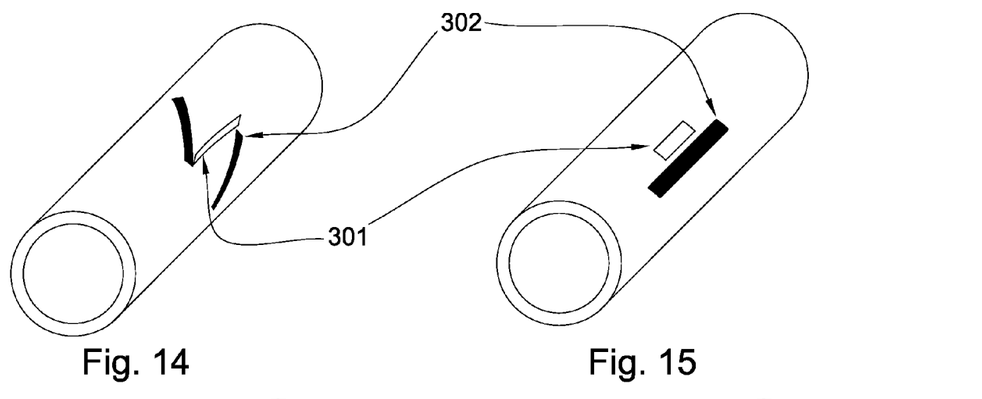
FIG. 14 is a perspective diagram of an embodiment of an induction resistivity assembly.
FIG. 15 is a perspective diagram of an embodiment of an induction resistivity assembly.

FIG. 14 illustrates an embodiment of a tool string component 100P having a transmitter unit 301P that is substantially aligned with an axis of the tool string component 100P. Magnetic field generating mechanisms 302P are circumferentially adjacent the transmitter units 301P are titled at an angle with respect to the axis.

FIG. 15 illustrates an embodiment of a tool string component 100Q having magnetic field generating mechanism 302Q on only one side of a transmitter unit 301Q.

Figures 16, 17:
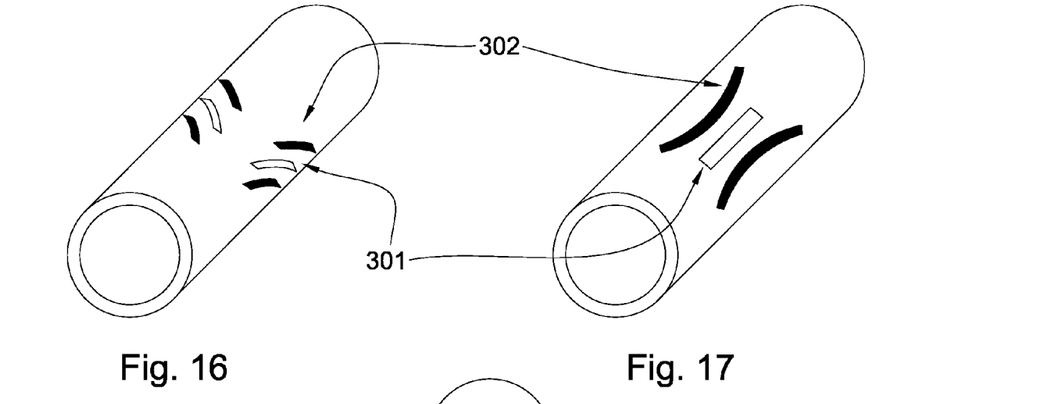
FIG. 16 is a perspective diagram of an embodiment of an induction resistivity assembly.
FIG. 17 is a perspective diagram of an embodiment of an induction resistivity assembly.

FIG. 16 illustrates an embodiment of a tool string component 100R having two transmitter units 301R tilted at different angles and the magnetic field generating mechanisms 302R substantially aligned with their respective transmitter units 301R. The different angles may be opposing angles as shown, or the angles may be slighter variations of each other.

FIG. 17 illustrates an embodiment of a tool string component 100S having arced magnetic field generating mechanism 302S that are bowed inward towards transmitter units 301S.

Figure 18:
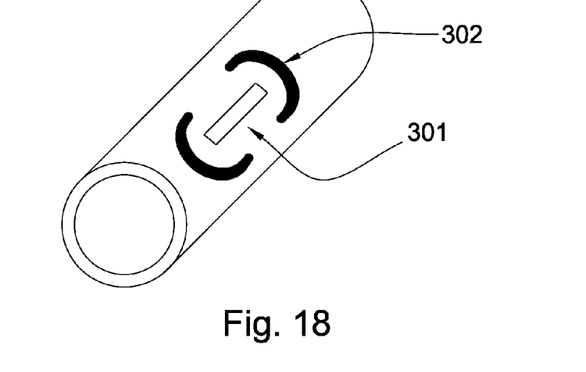
FIG. 18 is a perspective diagram of an embodiment of an induction resistivity assembly.

FIG. 18 illustrates an embodiment of a tool string component 100T having plurality of magnetic field generating mechanisms 302T around transmitter unit 301T. The plurality of magnetic field generating mechanisms 302T may be concentric as shown, or they may offset from one another. In some embodiments, the mechanisms may be offset from transmitter units 301T.

Whereas the present invention has been described in particular relation to the drawings attached hereto, it should be understood that other and further modifications apart from those shown or suggested herein, may be made within the scope and spirit of the present invention.

The invention claimed is:

1. A downhole induction resistivity assembly, comprising:
   a tool string component configured to be conveyed into a wellbore;
   an induction transmitter disposed on a surface of the component, the induction transmitter adapted to generate an induction signal and transmit the induction signal into a formation adjacent the wellbore;
   an induction receiver being spaced axially apart from the transmitter, the induction receiver adapted to receive a formation signal representative of a characteristic of the formation;
   a plurality of magnetic field generating mechanisms spaced circumferentially about the surface of the component and at least one of the magnetic field generating mechanisms being adjacent to the induction transmitter, the plurality of magnetic field generating mechanisms adapted to generate a magnetic field configured to influence the induction signal.

2. The downhole induction resistivity assembly of claim 1, wherein at least one of the magnetic field generating mechanisms comprises a Halbach array.

3. The downhole induction resistivity assembly of claim 1, wherein at least one of the magnetic field generating mechanisms generates a directed magnetic field.

4. The downhole induction resistivity assembly of claim 1, wherein at least one of the magnetic field generating mechanisms comprises a substantially U-shaped magnetic core.

5. The downhole induction resistivity assembly of claim 1, wherein the induction transmitter comprises at least one coil disposed circumferentially about the tool.

6. The downhole induction resistivity assembly of claim 5, wherein a magnetically conductive, electrically insulating material is disposed adjacent a surface of the component and the coil.

7. The downhole induction resistivity assembly of claim 1, wherein a second magnetic field generating mechanism is located on an opposite side of and proximate the transmitter.

8. The downhole induction resistivity assembly of claim 1, wherein the transmitter comprises a magnetic core disposed substantially parallel with an axis of the component.

9. The downhole induction resistivity assembly of claim 1, wherein the transmitter comprises a plurality of units that are independently excitable.

10. The downhole induction resistivity assembly of claim 9, wherein the plurality of units are circumferentially spaced about the tool.

11. The downhole induction resistivity assembly of claim 9, wherein the units are tilted with respect to a central axis of the component.

12. The downhole induction resistivity assembly of claim 1, wherein at least one of the receivers comprises a core positioned substantially perpendicular to another induction resistivity receiver.

13. The downhole induction resistivity assembly of claim 1, wherein the transmitter comprises litz wire.

14. The downhole induction resistivity assembly of claim 1, wherein each of the plurality of magnetic field generating mechanisms on opposing sides of the transmitter are electrically connected to one another.

15. The downhole induction resistivity assembly of claim 1, wherein the plurality of magnetic field generating mechanisms and a plurality of transmitters alternate along the circumference of the tool string component.

16. The downhole induction resistivity assembly of claim 1, wherein at least one of the receivers comprise a magnetic core disposed substantially parallel with an axis of the component.

17. The downhole induction resistivity assembly of claim 1, wherein at least one of the receivers comprises a plurality of units that is independently excitable.

18. The downhole induction resistivity assembly of claim 1, wherein at least one of the receivers comprises litz wire.

19. The downhole induction resistivity assembly of claim 17, wherein the plurality of units are circumferentially spaced about the tool.

* * * * *